United States Patent

Kato et al.

[11] Patent Number: 5,219,809
[45] Date of Patent: Jun. 15, 1993

[54] DIELECTRIC CERAMIC COMPOSITION AND DIELECTRIC RESONATOR

[75] Inventors: Junichi Kato, Osaka; Hiroshi Kagata, Katano, both of Japan

[73] Assignee: Matsushita Electric Industrial Co., Ltd., Osaka, Japan

[21] Appl. No.: 724,885

[22] Filed: Jul. 2, 1991

[51] Int. Cl.$^5$ .............................................. C04B 35/48
[52] U.S. Cl. ..................... 501/135; 501/134; 501/104
[58] Field of Search .................... 501/135, 134, 104

[56] References Cited

U.S. PATENT DOCUMENTS

| | | | |
|---|---|---|---|
| 4,330,631 | 5/1982 | Kawashima et al. | 501/139 |
| 4,636,378 | 1/1987 | Pastor et al. | 501/135 |
| 4,716,134 | 12/1987 | Yamaguchi et al. | 501/135 |
| 4,755,493 | 7/1988 | Takeuchi et al. | 501/135 |
| 4,830,996 | 5/1989 | Hirai et al. | 501/135 |
| 4,849,384 | 7/1989 | Tatsuki et al. | 501/134 |
| 4,874,598 | 10/1989 | Oda et al. | 501/135 |

FOREIGN PATENT DOCUMENTS 0156603 7/1986 Japan .
1183166 8/1986 Japan .

OTHER PUBLICATIONS

Tatsuki et al., "Japanese Journal of Applied Physics", vol. 26, Supplement 26-2, pp. 80-82 (1987).

Primary Examiner—Mark L. Bell
Assistant Examiner—Deborah Jones
Attorney, Agent, or Firm—Wenderoth, Lind & Ponack

[57] ABSTRACT

A dielectric ceramic composition possessing a high relative dielectric constant, a high unloaded Q, and an excellent temperature characteristic is expressed as $xPbO\text{-}yZrO_2\text{-}zCaO$, in the relation of $x+y+z=1$, wherein x, y, z are in mol percentage ranges of $0.125 \leq x \leq 0.49$, $0.4 \leq y \leq 0.6$, $0.11 \leq z \leq 0.275$. A part of $ZrO_2$ of the composition formula may be replaced by $(B1B2)O_2$ (where B1 is Mg, Ca, Zn, Co, Ni, Mn, Cu, Al, Ga, or Y, and B2 is Nb, Ta, or W), or Sn.

7 Claims, 5 Drawing Sheets

DIELECTRIC CERAMIC COMPOSITION AND DIELECTRIC RESONATOR

BACKGROUND OF THE INVENTION

1. Field of the Invention

The present invention relates to a dielectric ceramic used in the microwave region, and a dielectric resonator using this ceramic.

2. Description of the Prior Art

Recently, as communication using electromagnetic waves in the microwave region has advanced, such as mobile telephones portable telephones and satellite broadcasting, it is demanded to downsize the equipment. For this purpose, it is necessary to reduce the size of the individual components composing the equipment. The dielectric is incorporated in such devices as a dielectric resonator in the filter element or oscillator. The size of the dielectric resonator is inversely proportional to the square root of the dielectric constant of the dielectric material itself when using the same resonance mode, and therefore manufacture of a small-sized dielectric resonator requires a material of high dielectric constant. Besides, other requirements of the dielectric include low loss in the microwave region or the high unloaded Q value, small changes of the resonant frequency with temperature, or small changes of the dielectric constant depending on temperature.

Dielectric materials hitherto used in this field include, among others, $Ba(Zn_{\frac{1}{3}}Ta_{\frac{2}{3}})O_3$, $BaO-TiO_2$ compositions, and their derivatives having some of the elements replaced by other elements. In all these materials, the relative dielectric constant is about 30, and it is too low to downsize the resonator. As a material with a higher dielectric constant, $BaO-TiO_2-Sm_2O_3$ composition was disclosed in U.S. Pat. No. 4,330,631 (May 18, 1982). This material has a relative dielectric constant of about 80, a high unloaded Q of about 3000 at 2 to 4 GHz, and a small temperature coefficient of the relative dielectric constant. In addition, $BaO-PbO-TiO_2-Nd_2O_3$ is known to have a relative dielectric constant of over 90, as reported in the Journal of American Ceramic Society, Vol 67 (1984), pp.278–281.

However, for further reduction of the resonator size, materials of much higher dielectric constant are demanded, but materials possessing both high unloaded Q and small temperature coefficient are not known yet so far. On the other hand, the value of the temperature coefficient of the dielectric constant is generally negative when the dielectric constant is higher, but some materials have a positive value such as $PbZrO_3$. It is hence attempted to reduce the temperature coefficient by combining materials having positive and negative temperature coefficient values. Materials having negative temperature coefficient include $TiO_2$ and $SrTiO_3$, among others, and materials having positive temperature coefficient are represented, for example, by $PbO-ZrO_2-Tb_4O_7$ which is disclosed in U.S. Pat. No. 4,849,384 (Jul. 18, 1989), as the system having lanthanide oxide added to $PbO-ZrO_2$. This material has the relative dielectric constant of over 100, and contributes greatly to downsizing of the resonator, but the temperature coefficient of the resonant frequency, $\tau_f$, is about $-1,000$ ppm/°C., which shows a large change by temperature.

SUMMARY OF THE INVENTION

It is hence a first object of the invention to present a material having a relative dielectric constant larger than that of the hitherto known material $BaO-TiO_2-Sm_2O_3$, a low loss in a microwave region, and a small temperature coefficient of the dielectric constant.

It is a second object of the invention to present a dielectric resonator smaller in size than the dielectric resonator using any hitherto known material.

To achieve these objects, the invention presents a novel composition expressed as $xPbO-yZrO_2-zCaO$, where $x+y+z=1$, and x, y, z are in mol percentage ranges of $0.125 \leq x \leq 0.49$, $0.4 \leq y \leq 0.6$, $0.11 \leq z \leq 0.275$, respectively. This novel composition possesses a high specific dielectric constant of over 40 in a microwave region of 2 to 6 GHz, and also a small temperature coefficient not exceeding 300 ppm/°C., and a high unloaded Q value of over 300.

The invention is further intended to improve the dielectric characteristics in the microwave region by replacing a part of the $ZrO_2$ of the formula expressed by $xPbO-yZrO_2-zCaO$ by $(B1B2)O_2$ (where B1 is one of Mg, Ca, Zn, Co, Ni Mn, Cu, Al, Ga, Y, and B2 is one of Nb, Ta, W), or Sn.

DESCRIPTION OF THE PREFERRED EMBODIMENTS

Embodiment 1

Using PbO, $CaCO_3$, $ZrO_2$ as starting materials, they were weighed as specified according to x, y, z of the formula $xPbO-yZrO_2-zCaO$ so as to achieve the composition shown in Table 1. These powder materials were put in a polyethylene ball mill containing stabilized zirconia pebbles, and purified water was added to the mixture, and mixed for 17 hours. After mixing, the slurry was dried, and put in an alumina crucible, and was calcined for 2 hours at 750° to 850° C. The calcined material was crushed by pulverizer, and ground in the same ball mill for 17 hours, and dried and material powder was obtained. To this powder, 5% aqueous solution of polyvinyl alcohol was added as binder by 6 wt. %, and mixed, and the mixture was passed through a 32-mesh sieve and granulated, and pressed and formed into a column of 13 mm in diameter and about 5 mm in thickness at 100 MPa. This forming was heated to 600° C. for 2 hours to burn out the binder, and the residue was put into a magnesia container, and sintered for 2 hours at 1,100° to 1,400° C. depending on the composition while preventing evaporation of PbO by spreading the calcined powder of the same composition in the surroundings. The obtained sinter was measured by the dielectric resonator method, and the resonant frequency and unloaded Q were determined. Besides, from the dimensions of the sinter and the resonant frequency, the relative dielectric constant was calculated. The resonant frequency was 2 to 6 GHz. At −25° C. and 85° C., the resonant frequency was measured, and the temperature coefficient ($\tau_f$) was calculated on the basis of the value at 20° C. The results are shown in Table 1.

As clear from Table 1, in the composition in which x, y, z are respectively in the ranges of $0.125 \leq x \leq 0.49$, $0.4 \leq y \leq 0.6$, $0.11 \leq z \leq 0.275$, the dielectric constant is as high as 40 to 165, and the unloaded Q is over 200, and the temperature coefficient of the resonant frequency does not exceed 150 ppm/°C. In particular, the sample numbers 5, 7, 11, 12 in which x, y, z are in the ranges of $0.28 \leq x \leq 0.425$, $0.45 \leq y \leq 0.52$, $0.125 \leq z \leq 0.2$ present excellent characteristics with the relative dielectric constant of over 100, unloaded Q of over 300, and temperature coefficient of resonant frequency of 40 ppm/°C. or less.

Figure 1:
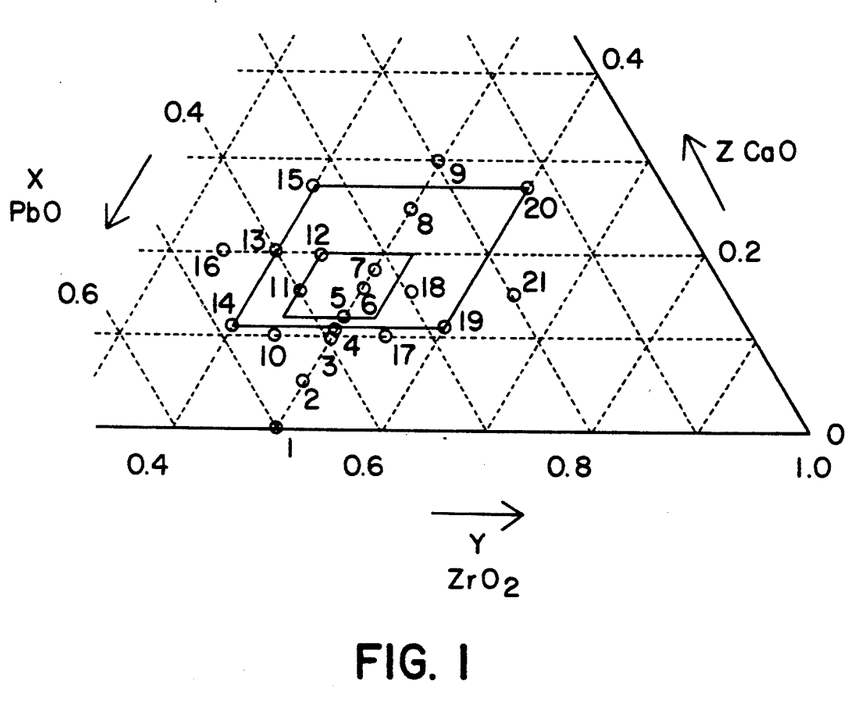
FIG. 1 is a diagram showing a part of the ternary system indicating a desired composition range of $xPbO-yZrO_2-zCaO$, in which sample numbers correspond to Table 1.

However, the compositions not included in the above range, that is, the range in FIG. 1 bounded by sample numbers 15, 14, 19 and 20, are not suitable as dielectrics for microwave devices. More specifically, in the compositions of which CaO is less than 0.11 (sample numbers 1, 2, 3, 10, 17 in Table 1), the unloaded Q is less than 200, or the temperature coefficient of the resonant frequency is over 200 ppm/°C., or both, and they are not applicable as dielectric resonators. Or in the composition of which CaO is more than 0.275 (sample number 9 in Table 1), the relative dielectric constant is less than 40. If $ZrO_2$ is less than 0.4 (sample 16 in Table 1), the unloaded Q is less than 200, and in the composition exceeding 0.6 (sample number 21 in Table 1), the dielectric is not sintered densely at temperature of less than 1,400° C.

Embodiment 2

In addition to the starting materials of Embodiment 1, powders of MgO, ZnO, CoO, NiO, $MnO_2$, CuO, $Al_2O_3$, $Ga_2O_3$, $Y_2O_3$, $Nb_2O_5$, $Ta_2O_5$, $Sb_2O_3$, $WO_3$ were weighed as specified so as to compose as Shown in Table 2, according to x, y, z, m, and n of the composition formula, $Pb_{1-x}Ca_xZr_{1-y}(B1_mB2_n)_yO_3$ (where B1 is an element selected from a group of Mg, Ca, Zn, Co, Ni, Mn, Cu, Al, Ga, and Y, B2 is an element selected from a group of Nb, Ta, Sb, and W, and m and n are the values selected to satisfy the relation of $axm+bxn=4$, while keeping the relation of $m+n=1$, supposing the valence of element B1 as a, and the valence of element B2 as b), and ceramics were prepared in the same manner as in Embodiment 1, and the dielectric characteristics were measured, of which results are shown in Table 2.

As clear from Table 2, in the compositions in which x and y of the formula $(Pb_{1-x}Ca_x)Zr_{1-y}(B1_mB2_n)_yO_3$ are in the ranges of $0.25 \leq x \leq 0.5$, and $0 \leq y \leq 0.2$, respectively, the dielectric constant is 60 or higher, the unloaded Q is 300 or higher, and the absolute value of temperature coefficient of resonant frequency is 100 ppm/°C. or less. Besides, in the compositions of sample numbers 1 to 5 in which Zr is not replaced by $(B1_mB_n)$ the results of two sintering processes did not match, but in the compositions having Zr replaced by $(B1_mB2_n)$ (sample numbers 18, 33, 36, 38, 40, 41, 42, 47), the sintering temperature is 1,250° C. or less, and the results of the sintering test performed twice matched well. This is considered due to decrease of the sintering temperature, small evaporation of PbO, and hence the characteristics are stabilized.

Incidentally, where B1 is Mg, B2 is Nb, m is ⅓, and n is ⅔, that is, when $ZrO_2$ of $PbO$-$ZrO_2$-$CaO$ is replaced by $(Mg_{⅓}Nb_{⅔})O_2$, an excellent dielectric characteristic was obtained in the microwave region, for the substitutional volume in a wide range where x exceeds 0.25 in the above formula. The results are shown in Table 3.

Figure 2:
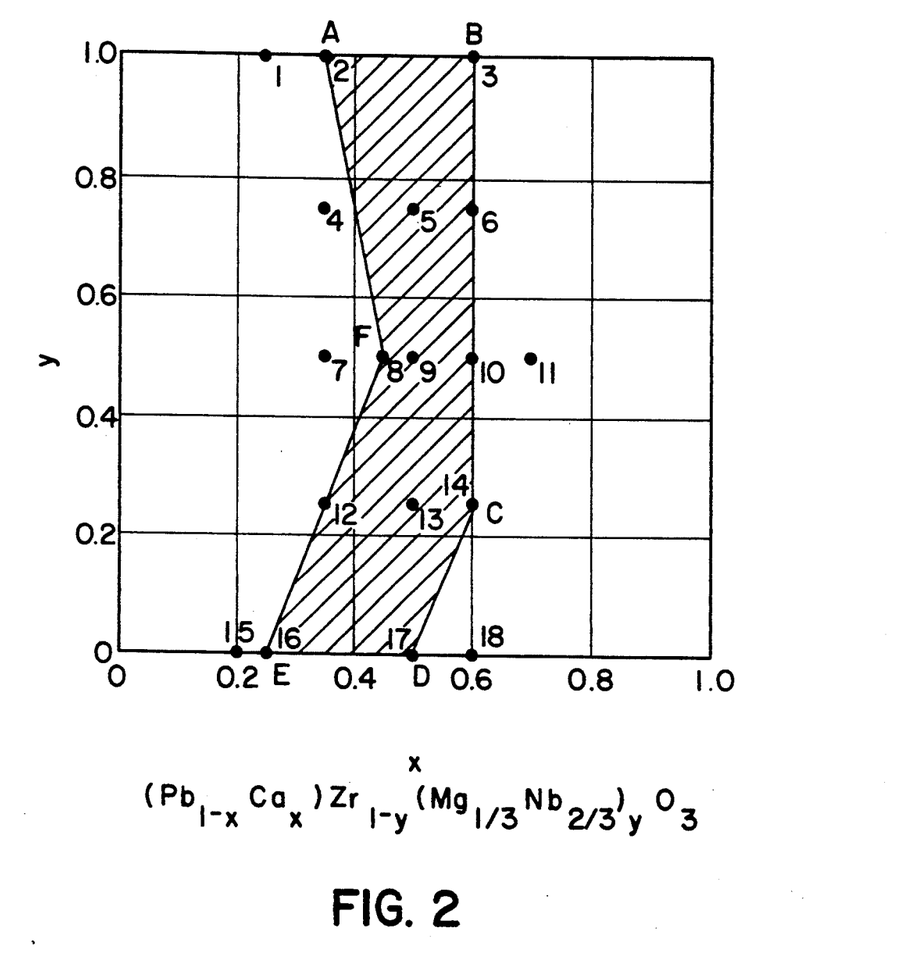
FIG. 2 is a composition diagram showing a desired composition range of $(Pb_{1-x}Ca_x)Zr_{1-y}(Mg_{\frac{1}{3}}Nb_{\frac{2}{3}})_yO_3$ system, in which sample numbers correspond to Table 3.

In Table 3, the composition of which dielectric constant is as high as 64 to 151, unloaded Q is 200 or higher, and absolute value of temperature coefficient resonant frequency is 150 ppm/°C. or less are in a range of a polygon in which x and y as expressed in the formula $(Pb_{1-x}Ca_x)Zr_{1-y}(Mg_{⅓}Nb_{⅔})_yO_3$ are on an xy plane shown in FIG. 2, having the vertexes at the following points, A (x=0.35 y=1.0), B (x=0.6 y=1.0), C (x=0.6 y=0.25), D (x=0.5 y=0.0), E (x=0.25 y=0.0), F (x=0.45 y=0.5). However, in the compositions in which x and y are not included in the polygon ABCDEF, any one of the following is present, in which the dielectric constant is 50 or less, the unloaded Q is 200 or less, and the temperature coefficient of the resonant frequency is 200 ppm/°C. or more, and desired characteristics as the dielectric for microwave are not obtained.

Furthermore, when B1 is Ni, B2 is Nb, m is ⅓, and n is ⅔, that is, when $ZrO_2$ of $PbO$-$ZrO_2$-$CaO$ is replaced by $(Ni_{⅓}Nb_{⅔})O_2$, same as when replaced by $(Mg_{⅓}Nb_{⅔})$, excellent dielectric characteristics were obtained in the microwave region, for substitutional volume in a wide range. The results are shown in Table 4.

Figure 3:
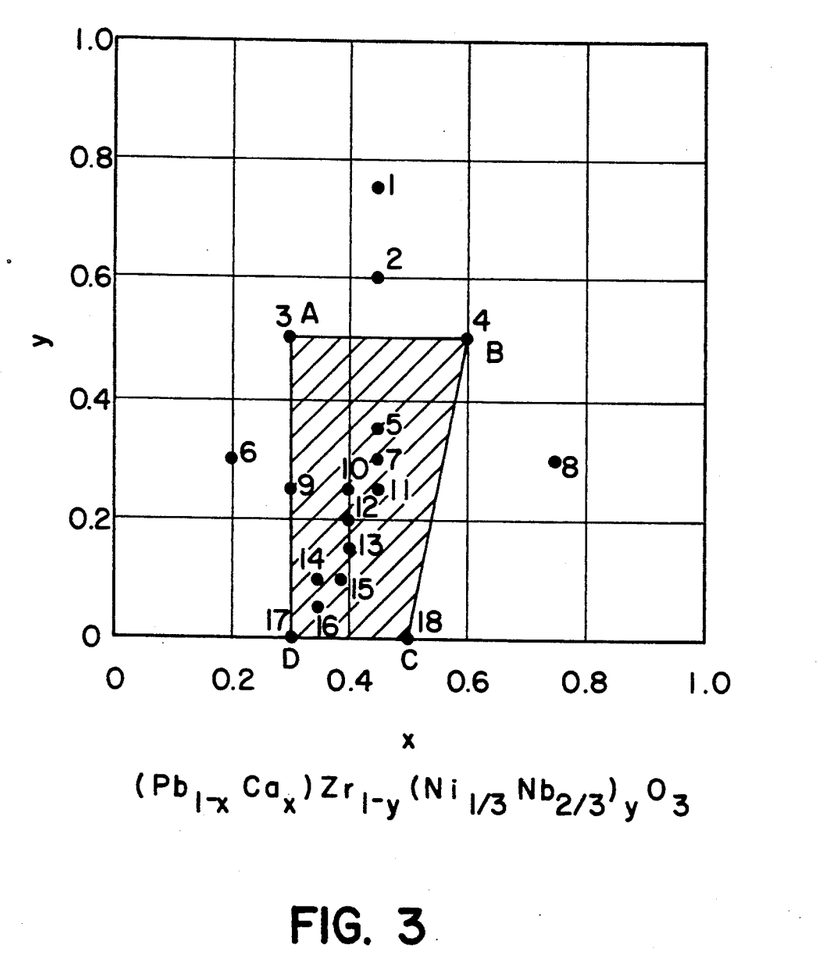
FIG. 3 is a composition diagram showing a desired composition range of $(Pb_{1-x}Ca_x)Zr_{1-y}(Ni_{\frac{1}{3}}Nb_{\frac{2}{3}})_yO_3$ system, in which sample numbers correspond to Table 4.

In Table 4, the compositions of which dielectric constant is as high as 68 to 172, unloaded Q is 250 or more, and absolute value of temperature coefficient of resonant frequency is 100 ppm/°C. or less are within a range of a quadrangle in which x and y as expressed in the formula $(Pb_{1-x}Ca_x)Zr_{1-y}(Ni_{⅓}Nb_{⅔})_yO_3$ are on an xy plane shown in FIG. 3, with the vertexes at A (x=0.3 y=0.5), B (x=0.6 y=0.5), C (x=0.3 y=0.0), and D (x=0.5 y=0.0). In particular, sample numbers 7 and 11 present superior characteristics with the relative dielectric constant of 120 or more, and absolute value of temperature change of resonant frequency of 10 ppm/°C. or less. In sample numbers 4, 14, 15, 16, the absolute values of temperature coefficient of resonant frequency are 100 ppm/°C. or less, and the unloaded Q is 1,000 or more, and excellent characteristics were exhibited. However, in the compositions not included in the quadrangle ABCD, any one of the following is present, in which the relative dielectric constant is 50 or less, the unloaded Q is 200 or less, or the temperature coefficient of resonant frequency is 200 ppm/°C. or more, and desired characteristics as the dielectric for microwaves are not obtained.

Embodiment 3

In addition to the starting materials in Embodiment 1, $SnO_2$ powder was used, and weighed as specified so that x and y in the formula $(Pb_{1-x}Ca_x)Zr_{1-y}Sn_yO_3$ may form the composition as shown in Table 5, and ceramics were prepared in the same manner as in Embodiment 1. The results of measuring the dielectric characteristics of these ceramics are shown in Table 5.

Figure 4:
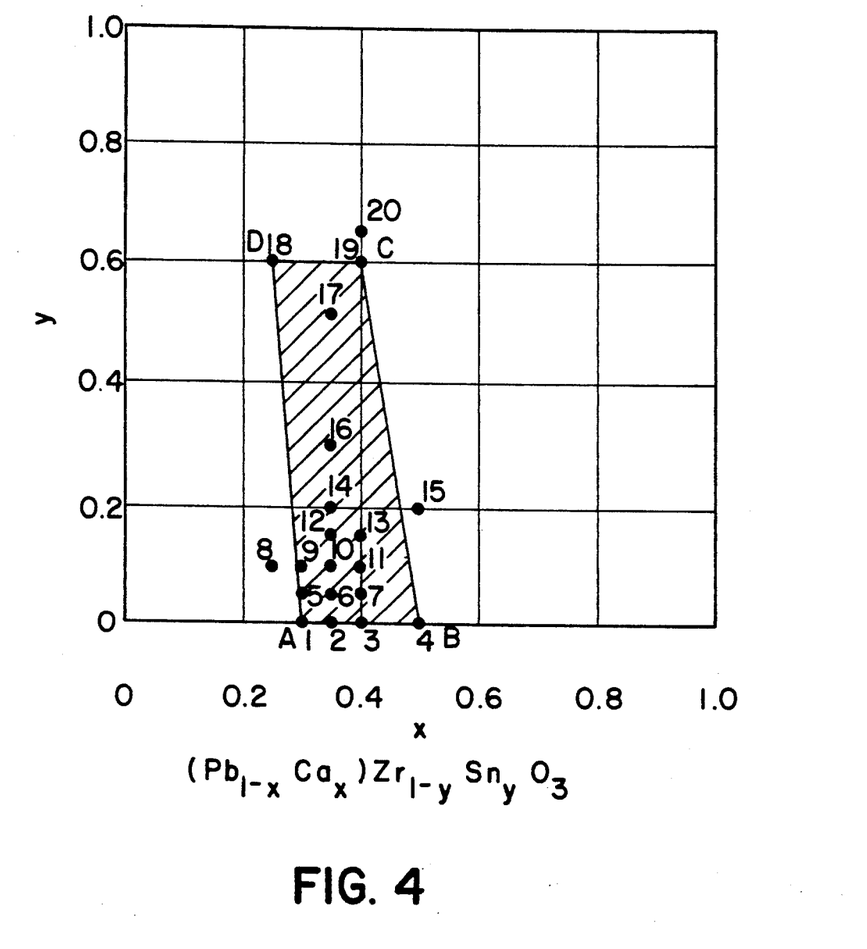
FIG. 4 is a composition diagram showing a desired composition range of $(Pb_{1-x}Ca_x)Zr_{1-y}Sn_yO_3$ system, in which sample numbers correspond to Table 5.

As clear from Table 5, in the compositions in which x and y are in a range of a quadrangle having the following points as the vertexes on the xy plane shown in FIG. 4; A (x=0.3 y=0.0), B (x=0.5 y=0.0), C (x=0.4 y=0.6), D (x=0.25 y=0.6), the dielectric constant is 60 or higher, the unloaded Q is 700 or higher, and the absolute value of temperature coefficient of resonant frequency is 100 ppm/°C. or less. As compared with the compositions not containing Sn shown in sample numbers 1 to 4, although the unloaded Q is improved, in the compositions not included in the quadrangle ABCD, any one of the following is present, in which the dielectric constant is 60 or less, the unloaded Q is 700 or less, or the temperature coefficient of the resonant frequency is 100 ppm/° C. or more, and desired characteristics as the dielectric for microwaves are not obtained.

Embodiment 4

Figures 5A, 5B:
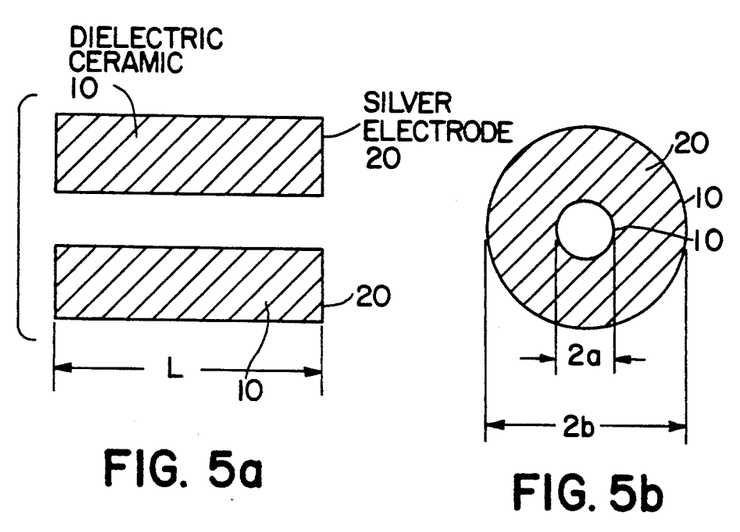
FIG. 5a is a diagram showing a longitudinal sectional view and FIG. 5b is a diagram showing a lateral sectional view of a coaxial resonator.

Of the compositions disclosed in Embodiments 1, 2 and 3, those shown in Table 6 are selected, and coaxial dielectric resonators shown in FIG. 5 were fabricated. The fabricating method of the dielectric resonators is described below. The powder combined with binder as shown in Embodiment 1 was pressed and formed into a cylindrical sample of 8.3 mm in outer diameter, 2.5 mm in inner diameter, and about 10 mm in height, and after burning out the binder, the material was sintered in the sintering method in Embodiment 1, and a cylindrical sinter 10 was fabricated. The sintered sample was coated with a silver paste on the inner wall, outer wall and one bottom of the cylindrical sinter 10 as shown in FIG. 5, and it was dried and baked at 800° C. for 15 minutes, and an electrode 20 was manufactured.

The inner diameter $2a$, outer diameter $2b$, height (length) L, resonant frequency, Q, and temperature coefficient $\tau_f$ of the resonant frequency of thus manufactured coaxial dielectric resonators are shown in Table 6.

As shown in Table 6, the resonators using the dielectrics of the invention are smaller in size than the resonators using the materials of the highest relative dielectric constant (90) among the hitherto known dielectrics, and at the same time it is evident that the Q value and temperature characteristics are equally comparable.

Thus, the ceramic compositions of the invention contain materials having a high relative dielectric constant of over 100 in a microwave region, and these materials are also high in the unloaded Q with 1,000 or more, and are sufficiently small in the temperature coefficient practically. Therefore, the ceramic compositions of the invention are not only useful as the material for dielectric resonator, but also effective for downsizing the circuit if applied in substrates for forming microwave circuits.

TABLE 1

| Sample No. | Composition x PbO | y $ZrO_2$ | z CaO | firing temperature °C. | Relative dielectric constant | Unloaded Q | Temperature coefficient of resonant freq. $\tau_f$ ppm/°C. |
|---|---|---|---|---|---|---|---|
| 1* | 0.5 | 0.5 | 0 | 1200 | 125 | 470 | −1500 |
| 2* | 0.45 | 0.5 | 0.05 | 1250 | 134 | 95 | −1250 |
| 3* | 0.4 | 0.5 | 0.1 | 1300 | 195 | 70 | −700 |
| 4 | 0.39 | 0.5 | 0.11 | 1300 | 165 | 280 | +50 |
| 5 | 0.0375 | 0.5 | 0.125 | 1300 | 162 | 310 | −25 |
| 6 | 0.35 | 0.5 | 0.15 | 1350 | 142 | 560 | +65 |
| 7 | 0.325 | 0.5 | 0.175 | 1350 | 115 | 820 | +28 |
| 8 | 0.25 | 0.5 | 0.25 | 1350 | 52 | 810 | −40 |
| 9* | 0.2 | 0.5 | 0.3 | 1400 | 35 | 750 | −43 |
| 10* | 0.45 | 0.45 | 0.1 | 1150 | 180 | 80 | −260 |
| 11 | 0.4 | 0.45 | 0.15 | 1150 | 124 | 410 | −35 |
| 12 | 0.35 | 0.45 | 0.2 | 1150 | 106 | 300 | −38 |
| 13 | 0.425 | 0.4 | 0.175 | 1100 | 85 | 450 | −100 |
| 14 | 0.49 | 0.4 | 0.11 | 1100 | 120 | 200 | −130 |
| 15 | 0.325 | 0.4 | 0.275 | 1200 | 66 | 430 | −40 |
| 16* | 0.45 | 0.35 | 0.2 | 1100 | 72 | 130 | −42 |
| 17* | 0.35 | 0.55 | 0.1 | 1350 | 180 | 45 | −2000 |
| 18 | 0.3 | 0.55 | 0.15 | 1350 | 130 | 510 | +80 |
| 19 | 0.29 | 0.6 | 0.11 | 1350 | 82 | 300 | +50 |
| 20 | 0.125 | 0.6 | 0.275 | 1400 | 43 | 760 | −40 |
| 21* | 0.2 | 0.65 | 0.15 | not sinter | — | — | — |

*The asterisk refers to a comparative example out of the range of the invention.

TABLE 2

| Sample No. | Composition x Pb | Chemical formula of $B1_mB2_n$ | y $B1_mB2_n$ | Firing temperature °C. | Relative dielectric constant 1st exp. | 2nd exp. | Unloaded Q | Temperature coefficient of resonant freq. $\tau_f$ ppm/°C. |
|---|---|---|---|---|---|---|---|---|
| 1 | 0.25 | — | 0 | 1300 | 162 | 155 | 310 | −30 |
| 2 | 0.35 | — | 0 | 1350 | 115 | 108 | 820 | +60 |
| 4 | 0.4 | — | 0 | 1350 | 91 | 97 | 860 | −24 |
| 5 | 0.5 | — | 0 | 1350 | 52 | 49 | 810 | −65 |
| 6 | 0.35 | $Mg_{\frac{1}{3}}Nb_{\frac{2}{3}}$ | 0.05 | 1350 | 105 | 111 | 800 | +37 |
| 7 | 0.35 | $Mg_{\frac{1}{3}}Nb_{\frac{2}{3}}$ | 0.1 | 1350 | 124 | 116 | 770 | +70 |
| 8 | 0.35 | $Mg_{\frac{1}{3}}Nb_{\frac{2}{3}}$ | 0.25 | 1350 | 151 | 155 | 490 | +125 |
| 9 | 0.5 | $Mg_{\frac{1}{3}}Nb_{\frac{2}{3}}$ | 0.1 | 1350 | 63 | 67 | 1050 | −53 |
| 10 | 0.35 | $Ni_{\frac{1}{3}}Nb_{\frac{2}{3}}$ | 0.05 | 1350 | 108 | — | 1120 | +35 |
| 11 | 0.35 | $Ni_{\frac{1}{3}}Nb_{\frac{2}{3}}$ | 0.1 | 1350 | 130 | — | 1050 | +50 |
| 12 | 0.38 | $Ni_{\frac{1}{3}}Nb_{\frac{2}{3}}$ | 0.1 | 1400 | 113 | — | 1170 | +30 |
| 13 | 0.38 | $Ni_{\frac{1}{3}}Nb_{\frac{2}{3}}$ | 0.15 | 1400 | 120 | — | 1010 | +37 |
| 14 | 0.4 | $Ni_{\frac{1}{3}}Nb_{\frac{2}{3}}$ | 0.25 | 1350 | 134 | — | 330 | +20 |
| 15 | 0.35 | $Zn_{\frac{1}{3}}Nb_{\frac{2}{3}}$ | 0.05 | 1300 | 120 | — | 960 | +53 |
| 16 | 0.35 | $Co_{\frac{1}{3}}Nb_{\frac{2}{3}}$ | 0.05 | 1350 | 121 | — | 1050 | +36 |
| 17 | 0.35 | $Co_{\frac{1}{3}}Nb_{\frac{2}{3}}$ | 0.1 | 1300 | 114 | — | 1030 | +39 |
| 18 | 0.35 | $Cu_{\frac{1}{3}}Nb_{\frac{2}{3}}$ | 0.05 | 1200 | 102 | 101 | 770 | +58 |

TABLE 2-continued

| Sample No. | Composition x Pb | Chemical formula of B1$_m$B2$_n$ | y B1$_m$B2$_n$ | Firing temperature °C. | Relative dielectric constant 1st exp. | 2nd exp. | Unloaded Q | Temperature coefficient of resonant freq. $\tau_f$ ppm/°C. |
|---|---|---|---|---|---|---|---|---|
| 19 | 0.35 | Mn$_\frac{1}{2}$Nb$_\frac{1}{2}$ | 0.1 | 1350 | 108 | — | 780 | +29 |
| *20 | 0.35 | Mn$_\frac{1}{2}$Nb$_\frac{1}{2}$ | 0.25 | 1300 | 96 | — | 410 | +32 |
| 21 | 0.35 | Al$_\frac{1}{2}$Nb$_\frac{1}{2}$ | 0.05 | 1350 | 88 | — | 940 | +36 |
| 22 | 0.35 | Y$_\frac{1}{2}$Nb$_\frac{1}{2}$ | 0.05 | 1350 | 91 | — | 1020 | +24 |
| 23 | 0.35 | Mg$_\frac{1}{3}$Ta$_\frac{2}{3}$ | 0.05 | 1400 | 112 | 118 | 1030 | +39 |
| 24 | 0.35 | Mg$_\frac{1}{3}$Ta$_\frac{2}{3}$ | 0.1 | 1400 | 123 | 113 | 790 | +51 |
| 25 | 0.35 | Ca$_\frac{1}{3}$Ta$_\frac{2}{3}$ | 0.05 | 1400 | 118 | — | 880 | +62 |
| 26 | 0.35 | Ca$_\frac{1}{3}$Ta$_\frac{2}{3}$ | 0.1 | 1400 | 107 | — | 750 | +56 |
| 27 | 0.35 | Ni$_\frac{1}{3}$Ta$_\frac{2}{3}$ | 0.05 | 1400 | 112 | 106 | 1180 | +34 |
| 28 | 0.35 | Ni$_\frac{1}{3}$Ta$_\frac{2}{3}$ | 0.1 | 1400 | 116 | 106 | 960 | +37 |
| 29 | 0.35 | Zn$_\frac{1}{3}$Ta$_\frac{2}{3}$ | 0.05 | 1300 | 121 | — | 940 | +43 |
| 30 | 0.35 | Zn$_\frac{1}{3}$Ta$_\frac{2}{3}$ | 0.1 | 1300 | 130 | — | 820 | +52 |
| 31 | 0.35 | Co$_\frac{1}{3}$Ta$_\frac{2}{3}$ | 0.05 | 1350 | 112 | — | 950 | +26 |
| 32 | 0.35 | Co$_\frac{1}{3}$Ta$_\frac{2}{3}$ | 0.1 | 1300 | 127 | — | 890 | +35 |
| 33 | 0.25 | Ni$_\frac{1}{3}$W$_\frac{2}{3}$ | 0.1 | 1050 | 191 | 188 | 390 | −65 |
| 34 | 0.3 | Ni$_\frac{1}{3}$W$_\frac{2}{3}$ | 0.05 | 1300 | 144 | 142 | 760 | +77 |
| 35 | 0.35 | Ni$_\frac{1}{3}$W$_\frac{2}{3}$ | 0.05 | 1300 | 114 | 116 | 1040 | +15 |
| 36 | 0.35 | Ni$_\frac{1}{3}$W$_\frac{2}{3}$ | 0.15 | 1100 | 125 | 124 | 590 | −52 |
| *37 | 0.35 | Ni$_\frac{1}{3}$W$_\frac{2}{3}$ | 0.3 | 1050 | 96 | 97 | 260 | −150 |
| 38 | 0.4 | Ni$_\frac{1}{3}$W$_\frac{2}{3}$ | 0.1 | 1250 | 95 | 95 | 1130 | −4 |
| 39 | 0.35 | Mg$_\frac{1}{3}$W$_\frac{2}{3}$ | 0.05 | 1350 | 115 | 110 | 910 | +30 |
| 40 | 0.35 | Mg$_\frac{1}{3}$W$_\frac{2}{3}$ | 0.1 | 1250 | 117 | 118 | 800 | +41 |
| 41 | 0.35 | Co$_\frac{1}{3}$W$_\frac{2}{3}$ | 0.05 | 1250 | 120 | 122 | 870 | +51 |
| 42 | 0.35 | Cu$_\frac{1}{3}$W$_\frac{2}{3}$ | 0.1 | 1150 | 132 | 129 | 690 | −40 |
| 43 | 0.35 | Mn$_\frac{1}{3}$W$_\frac{2}{3}$ | 0.05 | 1300 | 106 | 109 | 750 | −15 |
| 44 | 0.35 | Mg$_\frac{1}{3}$Sb$_\frac{2}{3}$ | 0.05 | 1300 | 116 | 112 | 790 | −55 |
| 45 | 0.35 | Ni$_\frac{1}{3}$Sb$_\frac{2}{3}$ | 0.05 | 1300 | 121 | 123 | 650 | −63 |
| 46 | 0.35 | Co$_\frac{1}{3}$Sb$_\frac{2}{3}$ | 0.05 | 1300 | 107 | 109 | 630 | −58 |
| 47 | 0.35 | Zn$_\frac{1}{3}$Sb$_\frac{2}{3}$ | 0.05 | 1250 | 114 | 111 | 560 | −66 |

*The asterisk refers to a comparative example out of the range of the invention.

TABLE 3

| Sample No. | Composition x Ca | y (Mg$_\frac{1}{3}$Nb$_\frac{2}{3}$) | Firing temperature °C. | Relative dielectric constant | Unloaded Q | Temperature coefficient of resonant freq. $\tau_f$ ppm/°C. |
|---|---|---|---|---|---|---|
| *1 | 0.25 | 1.0 | 1250 | 323 | 60 | +600 |
| 2 | 0.35 | 1.0 | 1200 | 124 | 310 | +110 |
| 3 | 0.6 | 1.0 | 1150 | 97 | 640 | +35 |
| *4 | 0.35 | 0.75 | 1300 | 192 | 100 | +305 |
| 5 | 0.5 | 0.75 | 1300 | 111 | 290 | +110 |
| 6 | 0.6 | 0.75 | 1300 | 72 | 1300 | +38 |
| *7 | 0.35 | 0.5 | 1300 | 201 | 95 | +200 |
| 8 | 0.45 | 0.5 | 1300 | 132 | 220 | +155 |
| 9 | 0.5 | 0.5 | 1350 | 116 | 270 | +115 |
| 10 | 0.6 | 0.5 | 1350 | 73 | 1280 | +17 |
| *11 | 0.7 | 0.5 | 1400 | 46 | 1550 | −45 |
| 12 | 0.35 | 0.25 | 1350 | 151 | 490 | +125 |
| 13 | 0.5 | 0.25 | 1400 | 90 | 530 | +46 |
| 14 | 0.6 | 0.25 | 1400 | 64 | 1330 | +25 |
| *15 | 0.2 | 0.0 | 1300 | 195 | 70 | +700 |
| 16 | 0.25 | 0.0 | 1300 | 162 | 310 | +42 |
| 17 | 0.5 | 0.0 | 1350 | 52 | 810 | +28 |
| *18 | 0.6 | 0.0 | 1400 | 35 | 750 | +30 |

*The asterisk refers to a comparative example out of the range of the invention.

TABLE 4

| Sample No. | Composition x Ca | y (Ni$_\frac{1}{3}$Nb$_\frac{2}{3}$) | Firing temperature °C. | Relative dielectric constant | Unloaded Q | Temperature coefficient of resonant freq. $\tau_f$ ppm/°C. |
|---|---|---|---|---|---|---|
| *1 | 0.45 | 0.75 | 1250 | 237 | 77 | +360 |
| *2 | 0.45 | 0.6 | 1300 | 162 | 320 | +240 |
| 3 | 0.3 | 0.5 | 1300 | 118 | 280 | +85 |
| 4 | 0.6 | 0.5 | 1350 | 68 | 1370 | −90 |
| 5 | 0.45 | 0.35 | 1350 | 147 | 250 | +43 |
| *6 | 0.2 | 0.3 | 1350 | 115 | 150 | +260 |
| 7 | 0.45 | 0.3 | 1350 | 134 | 250 | −5 |
| *8 | 0.75 | 0.3 | 1400 | 46 | 300 | −80 |
| 9 | 0.3 | 0.25 | 1350 | 172 | 510 | +100 |
| 10 | 0.4 | 0.25 | 1350 | 134 | 330 | +20 |
| 11 | 0.45 | 0.25 | 1350 | 125 | 280 | +5 |
| 12 | 0.4 | 0.2 | 1400 | 125 | 380 | +25 |
| 13 | 0.4 | 0.15 | 1400 | 116 | 530 | +30 |
| 14 | 0.35 | 0.1 | 1350 | 130 | 1050 | +50 |

TABLE 4-continued

| Sample No. | Composition x Ca | Composition y (Ni₁Nb⅔) | Firing temperature °C. | Relative dielectric constant | Unloaded Q | Temperature coefficient of resonant freq. τf ppm/°C. |
|---|---|---|---|---|---|---|
| 15 | 0.38 | 0.1 | 1400 | 113 | 1170 | +30 |
| 16 | 0.35 | 0.05 | 1350 | 108 | 1120 | +35 |
| 17 | 0.3 | 0.0 | 1350 | 142 | 560 | +130 |
| 18 | 0.5 | 0.0 | 1350 | 52 | 810 | −65 |

*The asterisk refers to a comparative example out of the range of the invention.

TABLE 5

| Sample No. | Composition x Ca | Composition y Sn | Firing temperature °C. | Relative dielectric constant | Unloaded Q | Temperature coefficient of resonant freq. τf ppm/°C. |
|---|---|---|---|---|---|---|
| 1 | 0.3 | 0 | 1300 | 154 | 300 | +90 |
| 2 | 0.35 | 0 | 1350 | 115 | 820 | +60 |
| 3 | 0.4 | 0 | 1350 | 91 | 860 | −24 |
| 4 | 0.5 | 0 | 1400 | 51 | 810 | −59 |
| 5 | 0.3 | 0.05 | 1400 | 146 | 700 | +95 |
| 6 | 0.35 | 0.05 | 1400 | 112 | 1190 | +37 |
| 7 | 0.4 | 0.05 | 1400 | 94 | 1390 | −15 |
| *8 | 0.25 | 0.1 | 1350 | 145 | 570 | +120 |
| 9 | 0.3 | 0.1 | 1400 | 126 | 930 | +89 |
| 10 | 0.35 | 0.1 | 1400 | 107 | 1330 | +29 |
| 11 | 0.4 | 0.1 | 1400 | 91 | 1400 | −29 |
| 12 | 0.35 | 0.15 | 1400 | 101 | 1340 | +17 |
| 13 | 0.4 | 0.15 | 1400 | 88 | 1340 | +2 |
| 14 | 0.35 | 0.2 | 1400 | 100 | 1310 | +25 |
| *15 | 0.5 | 0.2 | 1450 | 46 | 1160 | +103 |
| 16 | 0.35 | 0.3 | 1400 | 94 | 1270 | +18 |
| 17 | 0.35 | 0.5 | 1400 | 87 | 1350 | +9 |
| 18 | 0.25 | 0.6 | 1350 | 81 | 880 | +11 |
| 19 | 0.4 | 0.6 | 1400 | 64 | 1400 | −54 |
| *20 | 0.4 | 0.65 | 1400 | 53 | 1250 | +86 |

*The asterisk refers to a comparative example out of the range of the invention.

TABLE 6

| sample No. | Dielectric composition | inner diameter (2a) mm | outer diameter (2b) mm | length (L) mm | resonant frequency GHz | Q | τf ppm/°C. |
|---|---|---|---|---|---|---|---|
| *1 | Ba.₅Pb.₅Nd₂Ti₅O₁₄ | 7.11 | 2.14 | 8.98 | 878 | 420 | +55 |
| 2 | Pb.₆₅Ca.₃₅ZrO₃ | 6.85 | 2.06 | 7.76 | 881 | 430 | +33 |
| 3 | Pb.₆₄Ca.₃₆ZrO₃ | 6.99 | 2.11 | 8.15 | 890 | 430 | +26 |
| 4 | Pb.₆₃Ca.₃₇ZrO₃ | 7.00 | 2.11 | 8.20 | 897 | 450 | +17 |
| 5 | Pb.₆₅Ca.₃₅Zr.₉₅Sn.₀₅O₃ | 7.03 | 2.12 | 8.12 | 882 | 480 | +28 |
| 6 | Pb.₆₅Ca.₃₅Zr.₉₂₅Sn.₀₇₅O₃ | 7.05 | 2.12 | 8.20 | 884 | 470 | +24 |
| 7 | Pb.₆₄Ca.₃₆Zr.₉₅Sn.₀₅O₃ | 7.04 | 2.12 | 8.24 | 879 | 440 | +20 |
| 8 | Pb.₆₂Ca.₃₈Zr.₉₂(Ni₁Nb⅔).₀₈O₃ | 6.82 | 2.05 | 8.38 | 870 | 400 | +21 |

*The asterisk refers to the result of resonator composed of ceramic composition out of the scope of this invention.

What is claimed is:

1. A dielectric ceramic composition having in the microwave frequency region a relative dielectric constant of at least 40, an unloaded Q of at least 200 and an absolute value of a temperature coefficient of resonant frequency of at most 150 ppm/°C., and comprising lead oxide, zirconium oxide, and calcium oxide expressed by the formula, $xPbO-yZrO_2-zCaO$, wherein x, y, z are in the following mole percentage ranges:

$0.125 \leq x \leq 0.49$
$0.4 \leq y \leq 0.6$
$0.11 \leq z \leq 0.275$ where $x+y+z=1$.

2. The dielectric ceramic composition of claim 1, wherein x, y, z are in the following mole percentage ranges:

$0.28 \leq x \leq 0.425$
$0.45 \leq y \leq 0.52$
$0.125 \leq z \leq 0.2$ where $x+y+z=1$.

3. The dielectric composition of claim 1 wherein the $ZrO_2$ is partially replaced with $(B1mB2n)O_2$ resulting in a composition of the formula $PB_{1-x}Ca_xZr_{1-y}(B1mB2n)O_2$ in which B1 is an element selected from the group consisting of Mg, Ca, Zn, Co, Ni, Mn, Cu, Al, Ga, and Y, B2 is an element selected from the group consisting of Nb, Ta, Sb, and W, x and y are in the mol % ranges of $0.25 \leq x \leq 0.5$ and $0 \leq y \leq 0.2$, and m and n are values which satisfy the equation $axm+bxn=4$, $m+n=1$, and a is the valence of element B1 and b is the valence of element B2.

4. The dielectric ceramic composition of claim 3, wherein B1 is Mg, B2 is Nb, and x and y, when expressed in the formula of $(Pb_{1-x}Ca_x)Zr_{1-y}(Mg_{\frac{1}{3}}Nb_{\frac{2}{3}})_yO_3$, are within a range of a polygon having vertexes at the following points A, B, C, D, E, F, on the xy plane:

| A; x = 0.35 | y = 1.0 |
| B; x = 0.6 | y = 1.0 |
| C; x = 0.6 | y = 0.25 |
| D; x = 0.5 | y = 0.0 |
| E; x = 0.25 | y = 0.0 |
| F; x = 0.45 | y = 0.5. |

5. The dielectric ceramic composition of claim 3, wherein B1 is Ni, B2 is Nb, and x and y, when expressed in the formula of $(Pb_{1-x}Ca_x)Zr_{1-y}(Ni_{\frac{1}{3}}Nb_{\frac{2}{3}})_yO_3$, are within a range of a quadrangle having vertexes at the following points A, B, C, D on the xy plane:

| A; x = 0.3 | y = 0.50 |
| B; x = 0.6 | y = 0.5 |
| C; x = 0.3 | y = 0.0 |
| D; x = 0.5 | y = 0.0. |

6. The dielectric ceramic composition of claim 1, wherein expressing the composition having a part of $ZrO_2$ of the ceramic composition replaced by $SnO_2$ as $(Pb_{1-x}Ca_x)Zr_{1-y}Sn_yO_3$, x and y are within a range of a quadrangle having vertexes at the following points A, B, C, D on the xy plane:

| A; x = 0.3 | y = 0.0 |
| B; x = 0.5 | y = 0.0 |
| C; x = 0.4 | y = 0.6 |
| D; x = 0.25 | y = 0.6. |

7. A dielectric resonator comprising a sinter of the dielectric composition of any one of claims 1–6.

* * * * *